(12) United States Patent
Heller et al.

(10) Patent No.: US 7,575,480 B2
(45) Date of Patent: Aug. 18, 2009

(54) CROSSBAR CABLE INCLUDING ENCASING WRAP

(75) Inventors: Deborah H. Heller, Raleigh, NC (US); Jeffrey R. McClellan, Raleigh, NC (US); Derek Braid, Raleigh, NC (US); Dale Krisher, Wake Forest, NC (US); James Xavier Torok, Raleigh, NC (US); Thomas Bloom, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 174 days.

(21) Appl. No.: 11/692,357

(22) Filed: Mar. 28, 2007

(65) Prior Publication Data

US 2008/0240409 A1    Oct. 2, 2008

(51) Int. Cl.
*H01R 25/00* (2006.01)
*H01R 13/72* (2006.01)
*H01B 7/00* (2006.01)

(52) U.S. Cl. .............. 439/638; 439/501; 174/72 A
(58) Field of Classification Search .............. 439/638, 439/639, 640, 501, 502; 174/72 A; 385/135, 385/137; 340/825.05
See application file for complete search history.

(56) References Cited

U.S. PATENT DOCUMENTS

| | | | | |
|---|---|---|---|---|
| 3,994,090 A * | 11/1976 | Wheeler | | 40/316 |
| 4,424,627 A * | 1/1984 | Tarbox | | 29/857 |
| 4,847,611 A * | 7/1989 | Bekki et al. | | 370/258 |
| 5,303,287 A | 4/1994 | Laborde | | |
| 5,321,736 A | 6/1994 | Beasley | | |
| 5,340,333 A * | 8/1994 | Schroth | | 439/607 |
| 5,548,280 A * | 8/1996 | Pearce | | 370/403 |
| 5,892,926 A * | 4/1999 | Witkowski et al. | | 710/100 |
| 6,667,973 B1 | 12/2003 | Gorshe et al. | | |
| 6,694,083 B2 * | 2/2004 | Paradiso et al. | | 385/135 |
| 6,766,095 B1 * | 7/2004 | Bjorklund | | 385/135 |
| 7,098,404 B2 * | 8/2006 | Hirata et al. | | 174/72 A |
| 2005/0147067 A1 | 7/2005 | Mani et al. | | |
| 2005/0183881 A1 * | 8/2005 | Hirata et al. | | 174/117 F |

FOREIGN PATENT DOCUMENTS

WO        9824256       6/1998

OTHER PUBLICATIONS

"5×12 Unshielded Cable Connector Kit", "www.fciconnect.com", Aug. 2005, pp. 1-3, Publisher: FCI.

(Continued)

*Primary Examiner*—Chandrika Prasad
(74) *Attorney, Agent, or Firm*—Fogg & Powers LLC

(57) ABSTRACT

A crossbar cable to connect a crossbar switch with a plurality of outputs comprises a switch connector, a plurality of cables, a plurality of device connectors, and an encasing wrap. The switch connector comprises a plurality of sockets. Each cable has wires connected at a first end to a subset of the sockets in the switch connector. Each device connector is connected to a second end of the wires of one of the plurality of cables. Each of the device connectors is communicatively coupled over the wires to the subset of sockets at the first end of its respective one of the plurality of cables. An encasing wrap bundles the plurality of cables at least at the first ends of the plurality of cables.

38 Claims, 7 Drawing Sheets

OTHER PUBLICATIONS

"3.00mm (.118") Micro-Fit 3.0, BMI Panel-To-Panel Receptacle", "www.molex.com/product/pcb/microfit/microfit.html", 2005, p. 1, Publisher: Molex.

"RJ-45 Snagless Boot—Bag of 100", "http://www.lanshack.com/RJ-45-Snagless-Boot---Bag-of-100-P1341C56.aspx", 2007, Publisher: Atcom Inc.

"Power and Voice/Data Accessories", "Boardgames Pricelist", Jan. 2007, Publisher: www.specfurniture.com.

"Product Description Tripp Lite Network Connector", "http://www.etech4sale.com/Tripp_Lite_Network_connector_-/N031-050/partinfo-id-125186.html", 2007, p. 1, Publisher: Etech4Sale.Com.

* cited by examiner

CROSSBAR CABLE INCLUDING ENCASING WRAP

This application is related to U.S. patent application Ser. No. 11/692,449 having a title of "PROGRAMMABLE HIGH SPEED CROSSBAR SWITCH" (also referred to here as the "'449 Application") filed on the same date herewith. This application is also related to U.S. patent application Ser. No. 11/692,417 having a title of "CABLE MANAGEMENT SYSTEM" (also referred to here as the "'417 Application") filed on the same date herewith. The '449 Application and the '417 Application are hereby incorporated herein by reference.

BACKGROUND

Crossbar switches are connected to equipment by a plurality of cables, each of which is individually connected to a port in the crossbar switch and a port in the equipment. The plurality of cables can form a complex maze of cables due to the overlapping and intertwining of the cables as they connect various ports in the crossbar switch to the various ports in the equipment. It is difficult to identify which cable is connected to which ports on the equipment and the switch within the maze of cables. Typically, when the connection between a crossbar switch and the equipment is to be changed, a technician follows the connecting cable through the complex system of intertwined cables to find the other end of the cable. It is easy to mistakenly disconnect the wrong cable after attempting to follow a single cable through the maze of cables.

A connector that is connected to a plurality of cables often experiences significant strain from the weight of the cables, which can result in a shortened lifetime of the connector/cable interface.

SUMMARY

In a first embodiment, a crossbar cable to connect a crossbar switch with a plurality of outputs comprises a switch connector, a plurality of cables, a plurality of device connectors, and an encasing wrap. The switch connector comprises a plurality of sockets. Each cable has wires connected at a first end to a subset of the sockets in the switch connector. Each device connector is connected to a second end of the wires of one of the plurality of cables. Each of the device connectors is communicatively coupled over the wires to the subset of sockets at the first end of its respective one of the plurality of cables. An encasing wrap bundles the plurality of cables at least at the first ends of the plurality of cables.

In a second embodiment, a crossbar cable to connect a crossbar switch with a plurality of outputs comprises a switch connector, a plurality of category 6 cables, a plurality of RJ-45 connectors, and an encasing wrap. The switch connector comprises a plurality of sockets. The category 6 cables each have twisted wire pairs connected at a first end to a subset of the sockets. Each RJ-45 connector is connected to a second end of the twisted-wire pairs of one of the category 6 cables. The encasing wrap bundles the plurality of category 6 cables at least at the first ends.

In a third embodiment, a crossbar cable to connect a crossbar switch with a plurality of outputs comprises a switch connector, twelve category 6 cables bundled in an encasing wrap, and twelve RJ-45 connectors. The switch connector includes six connector subassemblies located in a housing. Each subassembly comprising ten sockets. The ten sockets form two subsets of four sockets and one subset of two sockets. The subset of two sockets is positioned between the subsets of four sockets. Each category 6 cable has four twisted wire pairs. Two of the four twisted wire pairs are connected at a first end to one of the subsets of four sockets. Each RJ-45 connector is connected to a second end of the two twisted wire pairs of respective ones of the twelve category 6 cables. The four wires forming the two twisted-wire pairs of each of the RJ-45 connectors are communicatively coupled to a respective one of the subsets of four sockets.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
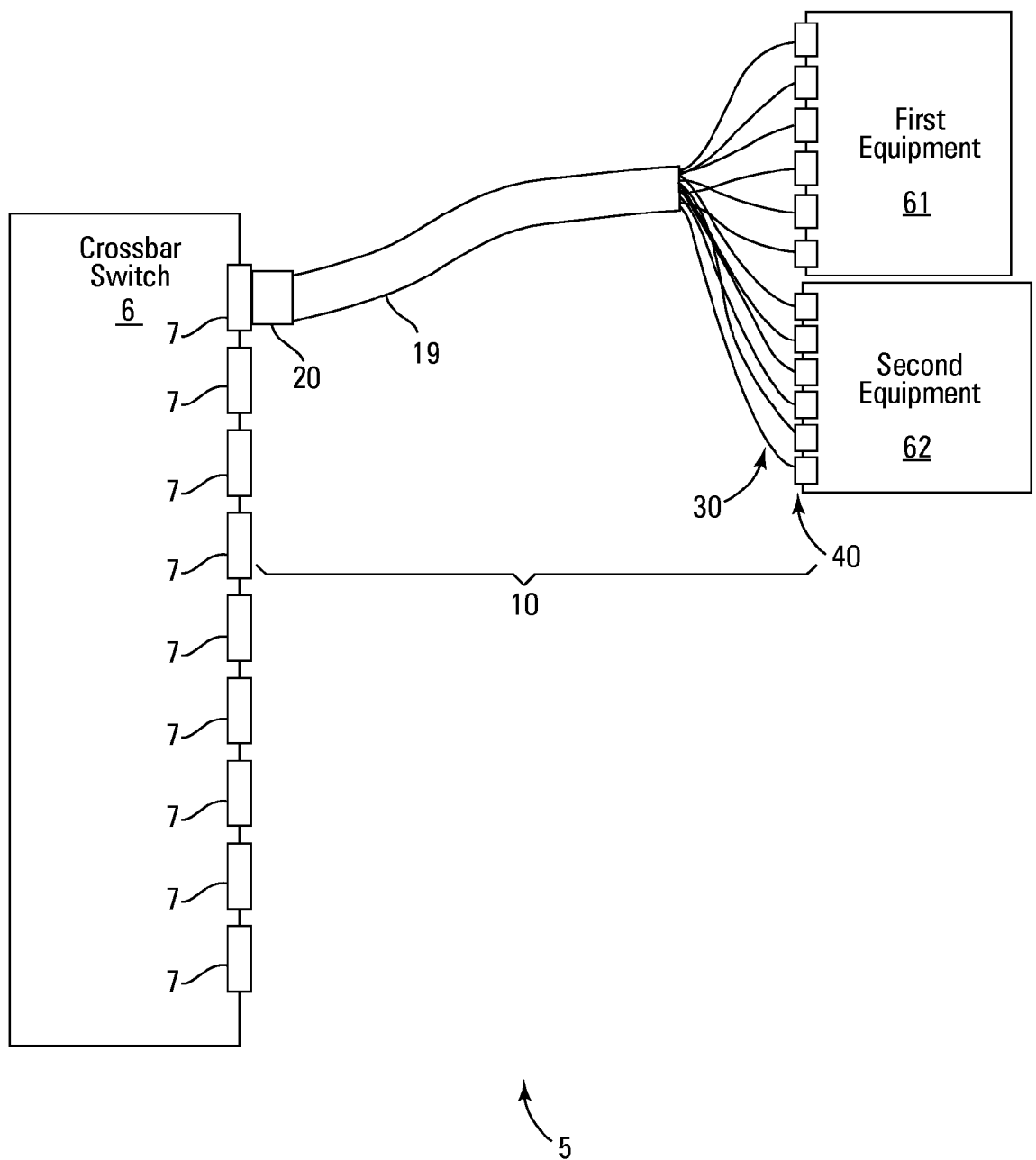
FIG. 1 is a block diagram of one embodiment of a system including a crossbar cable.

FIG. 1 is a block diagram of one embodiment of a system 5 including a crossbar cable 10. The crossbar cable 10 includes a switch connector 20, a plurality of cables 30, a plurality of device connectors 40 and an encasing wrap 19 to bundle the plurality of cables 30. The encasing wrap 19 provides strain relief at the interface between the cables 30 and the switch connector 20 and at the interface between the switch connector 20 and the coupled port 7. The system 5 also includes first equipment 61 and second equipment 62 connected to the crossbar switch 6, such as the crossbar switch described in the above referenced '449 Application. In implementations of this embodiment, the first equipment 61 and second equipment 62 are devices and/or equipment, such as amplifiers, combiners, transmitters, receivers, or routers.

Each of the cables 30 is terminated at an associated device connector 40 at the equipment/device end. All of the cables 30 are terminated at the same switch connector 20 at the crossbar switch end. In this example, the switch connector 20 is mated to a port 7 in the crossbar switch 6. The device connectors 30 are mated to ports in either the first equipment 61 or the second equipment 62. In this manner, the crossbar cable 10 connects the crossbar switch 6 with a plurality of outputs.

In one implementation of this embodiment, the switch connector is a FCI Future Bus 060 connector. The Future Bus 060 connector is made from a 5×12 unshielded cable connector kit in the Metral family of connectors. In another implementation of this embodiment, the device connector 30 is an RJ-45 connector.

In yet another implementation of this embodiment, the encasing wrap 19 is a shrink wrap that surrounds the cables 30 and extends from the switch connector 20 along the length of the cables 30 for at least three inches. In yet another implementation of this embodiment, the encasing wrap 19 is a sleeve that surrounds the cables 30 and extends from the switch connector 20 along the length of the cables 30 for at least three inches. In yet another implementation of this embodiment, the encasing wrap 19 is a zip wrap that surrounds the cables 30 and extends from the switch connector 20 along the length of the cables 30 for at least three inches. In yet another implementation of this embodiment, the encasing wrap 19 is a flexible tube that surrounds the cables 30 and extends from the switch connector 20 along the length of the cables 30 for at least three inches.

In yet another implementation of this embodiment, the cables 30 have different lengths. In yet another implementation of this embodiment, the encasing wrap 19 is a shrink wrap, a sleeve, a zip wrap, or a flexible tube that surrounds the cables 30 and extends from the switch connector 20 along the length of the cables 30 for least half of the length of the shortest cable 30. In yet another implementation of this embodiment, the encasing wrap 19 is a shrink wrap, a sleeve, a zip wrap, or a flexible tube that surrounds the cables 30 and extends from the switch connector 20 along the length of the cables 30 for least three-quarters of the length of the shortest cable 30.

In one implementation of this embodiment, there is a plurality of crossbar cables 10 connected to a plurality of ports 7 in the crossbar switch 6. In another implementation of this embodiment, there are more than two pieces of equipment connected to the crossbar cable 10. In yet another implementation of this embodiment, there is only one piece of equipment connected to the crossbar cable 10.

Figure 2:
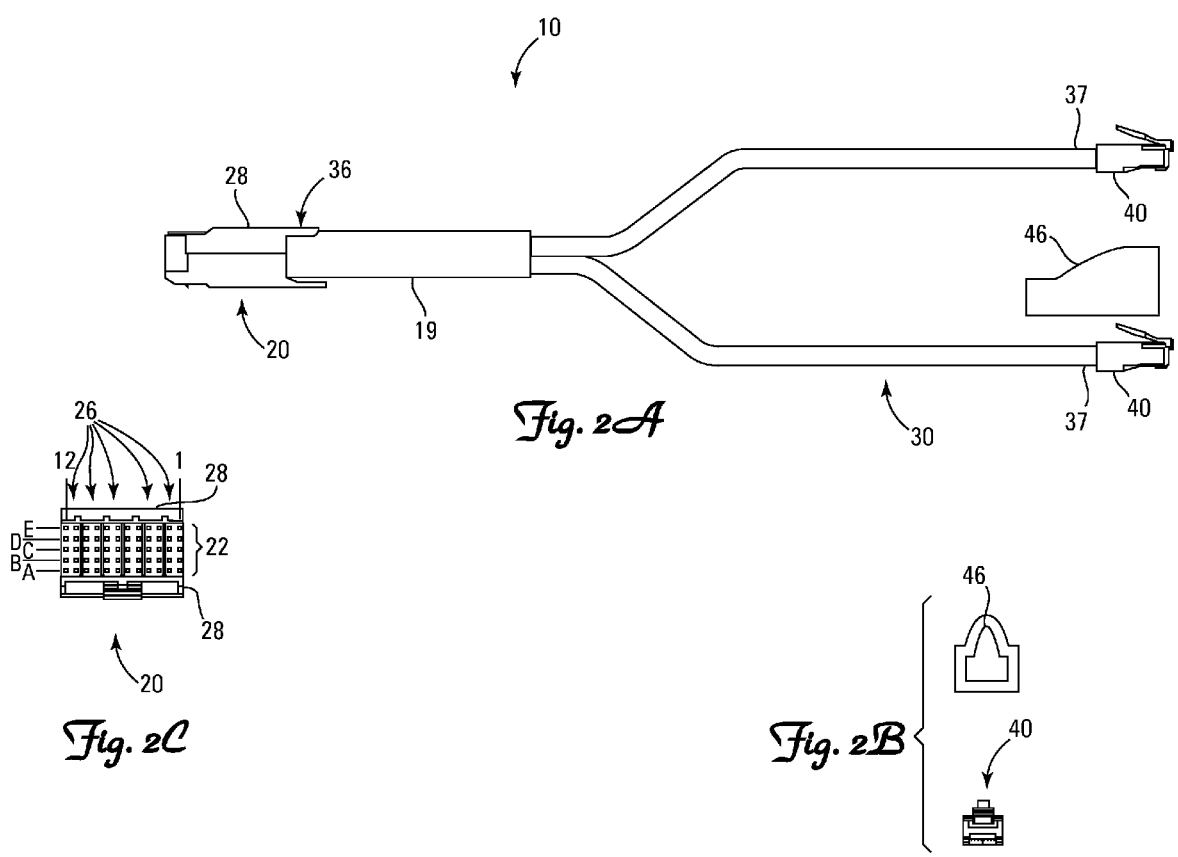
FIGS. 2A-2C are diagrams showing views of one embodiment of a crossbar cable.

FIGS. 2A-2C are diagrams showing views of one embodiment of a crossbar cable 10. FIG. 2A shows a side view of the crossbar cable 10 in which two of the plurality of cables 30 are visible. A housing 28 provides four exterior surfaces of the switch connector 20. FIG. 2B shows the front-face of the device connector 40. In the exemplary embodiment of the device connector shown in FIGS. 2A and 2B, the device connector is an RJ-45 connector, as known in the art. A side view and a front view of a cable boot 46 are shown in FIG. 2A and 2B, respectively. In operation, the cable boot 46 partially surrounds a device connector 40 and the end 37 of the cable 30 in order to protect the device connector 40, as known in the art.

Other device connectors can be used. For example, the plurality of device connectors can include a plurality of RJ-47 connectors, a plurality of RJ-11 connectors, a plurality of DB-9 connectors, a plurality of terminal wrap connectors, and combinations thereof. The first equipment 61 and the second equipment 62 (FIG. 1) include ports that are compatible with the device connectors 40.

FIG. 2C shows the front-face of the switch connector 20. The switch connector 20 includes a plurality of sockets 22. The sockets 22 are insulation displacement type sockets 22. The sockets 22 are numbered from one to twelve across the width (from right to left) and which are alphabetically labeled from A to E across the height (from bottom to top). Thus, the sixty sockets 22 are labeled as A1, A2, A3, A4, A5, A6, A7, A8, A9, A10, A11, A12, B1, B2, . . . E9, E10, E11, and E12. The sockets 22 are compatible with the ports 7 (FIG. 1) in the crossbar switch 6.

Figure 3:
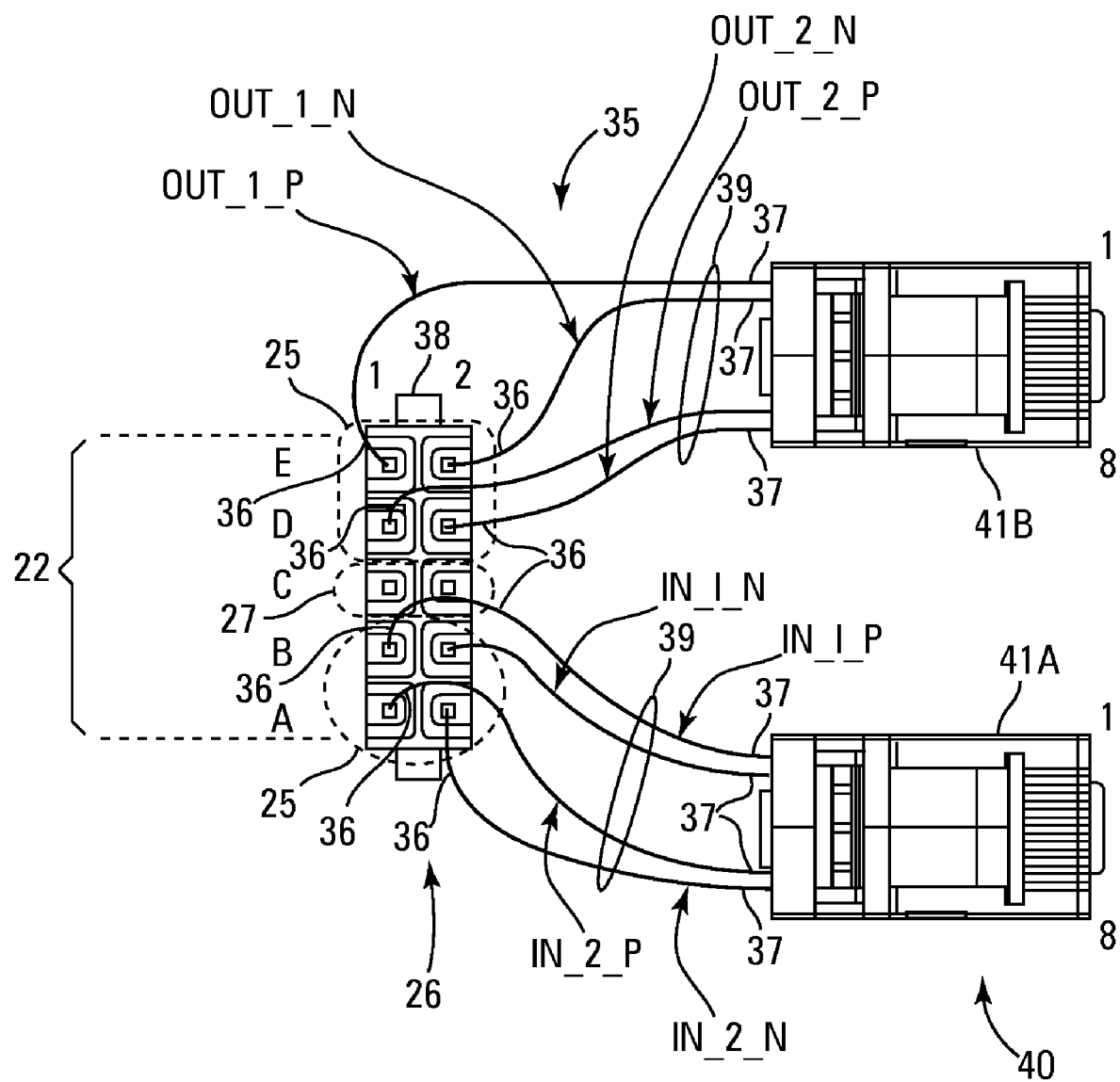
FIG. 3 is a diagram of one embodiment of a connector subassembly connected to two device connectors.

The switch connector 20 includes a plurality of connector subassemblies 26 that are positioned in a housing 28 which partially surrounds connector subassemblies. FIG. 3 is a diagram of one embodiment of a connector subassembly 26 connected to two device connectors 40. The connector subassembly 26 includes ten sockets 22. The shown connector subassembly 26 includes the sockets A1, A2, B1, B2, C1, C2, D1, D2, E1, and E2. The connector subassembly 26 includes two subsets 25 and a subset 27. The first subset 25 includes sockets A1, A2, B1, and B2 and the second subset 25 includes sockets D1, D2, E1, and E2. The subset 27 includes two unconnected sockets C1 and C2 that are positioned between the two subsets 25 of sockets 22. In one implementation of this embodiment, the subset 27 is connected to grounding wires in the device connector 40 (not shown).

Six connector subassemblies 26 are positioned in a housing 28 as shown in FIG. 2C. Each of the connector subassemblies 26 comprises a retention mechanism 38 to fix the connector subassembly 26 in the housing 28. In one implementation of this embodiment, the retention mechanism 38 is a pin or key which fits into slots or holes in the housing 28. The housing 28 can be disassembled to permit removal of the connector subassembly 26. Once the housing 28 is disassembled, another connector subassembly 26 (or the same connector subassembly 26) can be inserted into the resultant slot opened within the housing 28, when the housing 28 is disassembled. The connector subassembly 26 is then locked into position by the retention mechanism 38 and the housing 28 is reassembled. Thus, the relative positions of the plurality of connector subassemblies 26 are manually reconfigurable within the housing 28 so that at least one of the device connectors 40 is communicatively coupled to a different subset 25 of sockets 22 based on the reconfiguration.

In one implementation of this embodiment, the subset 27 is not included in the connector subassembly 26. In this case, each connector subassembly 26 comprises eight sockets A1, A2, B1, B2, D1, D2, E1, E2, that form two subsets 25 of sockets 22 (such as, the subset of sockets A1, A2, B1, B2 and the subset of sockets D1, D2, E1, E2).

In another implementation of this embodiment, the connector subassembly 26 includes only four sockets 22, or one subset 25 of sockets 22. In one implementation of this case, the crossbar cable 10 includes twenty-four cables 30.

As shown in FIG. 3, each connector subassembly 26 is communicatively coupled to at least one device connector 40 via wires 35. The wires 35 are in two of the cables 30 (FIG. 2A). The wires 35 are shown in an exploded view in order to clearly point out exemplary connections between two device connectors 40 and one connector subassembly 26. Thus, the wires 35 are shown without any cable coating, which typically covers exemplary cables 30, and without the encasing wrap 19 around the cables 30. In the exemplary embodiment shown in FIG. 3, the device connectors 40 include a first device connector 41A and a second device connector 41B.

The wires 35 are in groupings 39 of four wires. Each cable 30 is formed from the groupings 39 of four wires. The wires 35 in a grouping 39 are connected at a first end 36 to a single subset 25 that includes four sockets 22. The wires 35 labeled IN__1_P, IN__1_N, IN__2_N and IN__2_P are within one cable 30 of an exemplary crossbar cable 10. The wires labeled OUT__1_P, OUT__1_N, OUT__2_N and OUT__2_P are within another cable 30 of the exemplary crossbar cable 10.

The first end 36 of the wire labeled IN__1_P is connected to the socket B1 while the second end 37 is connected to the first device connector 41A. The first end 36 of the wire labeled IN__1_N is connected to the socket B2 while the second end 37 is connected to the first device connector 41A. In one implementation of this embodiment, the wires labeled IN__1_P and IN__1_N are the two wires in an input wire pair of cable 30. In another implementation of this embodiment, the wires connectable to an RJ-45 connector and labeled IN__1_P and IN__1_N are the two wires in a twisted-wire pair of a category 5 cable as defined in ANSI/TIA/EIA-568-A standards and the ANSI/TIA/EIA-568-B standards. In yet another implementation of this embodiment, the wires labeled IN__1_P and IN__1_N are the two wires in a twisted-wire pair of a category 6 cable as defined in ANSI/TIA/EIA-568-B.2-1 standards and the ANSI/TIA/EIA-568-B.2-10 standards. In yet another implementation of this embodiment, the wires labeled IN__1_P and IN__1_N are the two wires in a twisted-wire pair of a category 7 cable as defined in ISO/IEC 11801 standards.

The first end 36 of the wire labeled IN__2_N is connected to the socket A2 while the second end 37 is connected to the first device connector 41A and the first end 36 of the wire labeled IN__2_P is connected to the socket A1 while the second end 37 is connected to the first device connector 41A. In one implementation of this embodiment, the wires labeled IN__2_P and IN__2_N are the two wires in an input wire pair of cable 30. In another implementation of this embodiment, the wires labeled IN__2_P and IN__2_N are the two wires in a twisted-wire pair of a category 5 cable, a category 6 cable, or category 7 cable. Other currently developed and future developed cables can also be implemented as is understandable based on reading this specification.

The first end 36 of the wire labeled OUT__1_P is connected to the socket E1 while the second end 37 is connected to the second device connector 41B. The first end 36 of the wire labeled OUT__1_N is connected to the socket E2 while the second end 37 is connected to the second device connector 41B. In one implementation of this embodiment, the wires labeled OUT__1_P and OUT__1_N are the two wires in an output wire pair of cable 30. In another implementation of this embodiment, the wires labeled OUT__1_P and OUT__1_N are the two wires in a twisted-wire pair of a category 5 cable, a category 6 cable, or a category 7 cable.

The first end 36 of the wire labeled OUT__2_N is connected to the socket D2 while the second end 37 is connected to the second device connector 41B and the first end 36 of the wire labeled OUT__2_P is connected to the socket D1 while the second end 37 is connected to the second device connector 41B. In one implementation of this embodiment, the wires labeled OUT__2_P and OUT__2_N are the two wires in an output wire pair of cable 30. In another implementation of this embodiment, the wires labeled OUT__2_P and OUT__2_N are the two wires in a twisted-wire pair of a category 5 cable, a category 6 cable, or a category 7 cable.

Thus as shown in FIGS. 2A-2C and FIG. 3, the switch connector 20 comprises a plurality of connector subassemblies 26 each connector subassembly 26 being communicatively coupled to at least one device connector 40. In one implementation of this embodiment, two device connectors 40 are communicatively coupled to two subsets 25 of a connector subassembly 26. If the cables 30 are category 5 cables, category 6 cables, or category 7 cables, which include four twisted-wire pairs, then only two of the four twisted-wire pairs are active in the category 5 cables, the category 6 cables, or the category 7 cables.

In another implementation of this embodiment, connector subassembly 26 includes only a single subset 25 and one device connector 40 is communicatively coupled to such a connector subassembly 26. If the cables 30 are category 5 cables, category 6 cables, or category 7 cables, only two of the four twisted-wire pairs are active in the cable.

In yet another implementation of this embodiment, only one wire pair (e.g., a twisted-wire pair) of a first cable 30 is connected to two sockets 22 in a first subset 25 and only one wire pair of a second cable 30 is connected to the two other sockets 22 in the first subset 25. If the first and second cables 30 are category 5 cables, category 6 cables, or category 7 cables, only one of the four twisted-wire pairs is active in each of the first and second cables 30.

Figure 4:
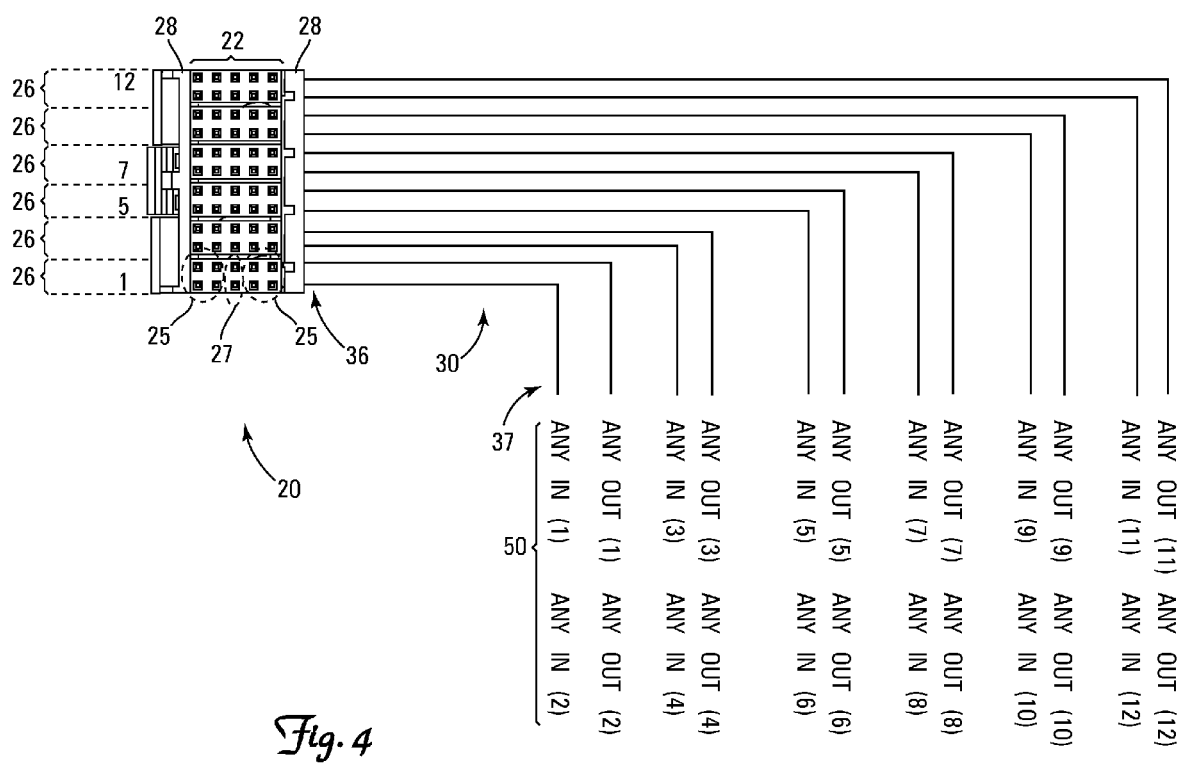
FIG. 4 is a diagram of one embodiment of a switch connector and a plurality of cables with respective labels.

FIG. 4 is a diagram of one embodiment of a switch connector 20 and a plurality of cables 30 with respective labels. The switch connector 20 includes six connector subassemblies 26, each of which includes two subsets 25 and one subset 27. Each one of the plurality of cables 30 are labeled at the second end 37. A set of exemplary labels is represented generally by numeral 50. The diagrammatic cables 30 are shown in FIG. 4 without the encasing wrap 19 to clearly show which cable 30 is connected to which connector subassembly 26.

The labels on each of the plurality of cables 30 indicate the connections between the sockets 22 of the switch connector 20 and the device connector 40 that are communicatively coupled by at least one wire pair in the coupling cable 30. Each label is nearer the second end 37 than the first end 36 of the twisted-wire pairs of the cable, since the section of the crossbar cable 10 closer to the first end 36 is sheathed by the encasing wrap 19 (FIG. 1).

Table 1 shows the label 50 on the cable 30 that connects one of the device connectors 40 with four of the connected sockets 22 of the switch connector 20. In one implementation of this embodiment, the device connector is an RJ-45 connector and the labeled cable is a category 5 cable. In another implementation of this embodiment, the device connector is an RJ-45 connector and the labeled cable is a category 6 cable. In yet another implementation of this embodiment, the device connector is an RJ-45 connector and the labeled cable is a category 7 cable.

TABLE 1

| Sockets | Device connector |
|---------|------------------|
| A1      | ANY IN (1)       |
| B1      |                  |
| A2      | ANY IN (2)       |
| B2      |                  |
| D1      | ANY OUT (1)      |
| E1      |                  |
| D2      | ANY OUT (2)      |
| E2      |                  |
| A3      | ANY IN (3)       |
| B3      |                  |
| A4      | ANY IN (4)       |
| B4      |                  |
| D3      | ANY OUT (3)      |
| E3      |                  |
| D4      | ANY OUT (4)      |
| E4      |                  |
| A5      | ANY IN (5)       |
| B5      |                  |
| A6      | ANY IN (6)       |
| B6      |                  |
| D5      | ANY OUT (5)      |
| E5      |                  |
| D6      | ANY OUT (6)      |
| E6      |                  |
| A7      | ANY IN (7)       |
| B7      |                  |
| A8      | ANY IN (8)       |
| B8      |                  |
| D7      | ANY OUT (7)      |

TABLE 1-continued

| Sockets | Device connector |
|---|---|
| E7 | |
| D8 | ANY OUT (8) |
| E8 | |
| A9 | ANY IN (9) |
| B9 | |
| A10 | ANY IN (10) |
| B10 | |
| D9 | ANY OUT (9) |
| E9 | |
| D10 | ANY OUT (10) |
| E10 | |
| A11 | ANY IN (11) |
| B11 | |
| A12 | ANY IN (12) |
| B12 | |
| D11 | ANY OUT (11) |
| E11 | |
| D12 | ANY OUT (12) |
| E12 | |

Figure 5A:
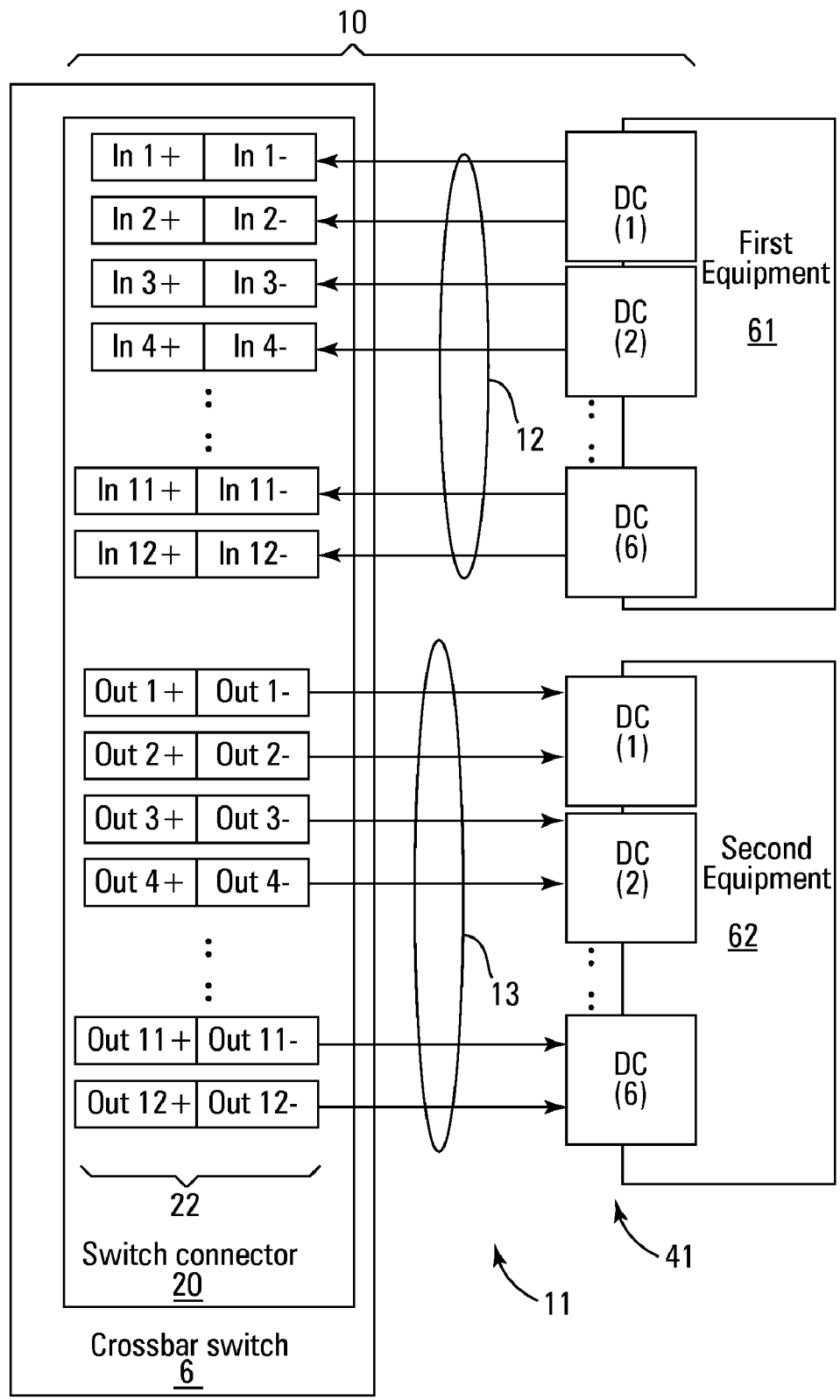
FIGS. 5A and 5B are block diagrams of one embodiment of connectivity for input wire pairs and output wire pairs in a crossbar cable configured for no-receive-diversity.
Figure 5B:
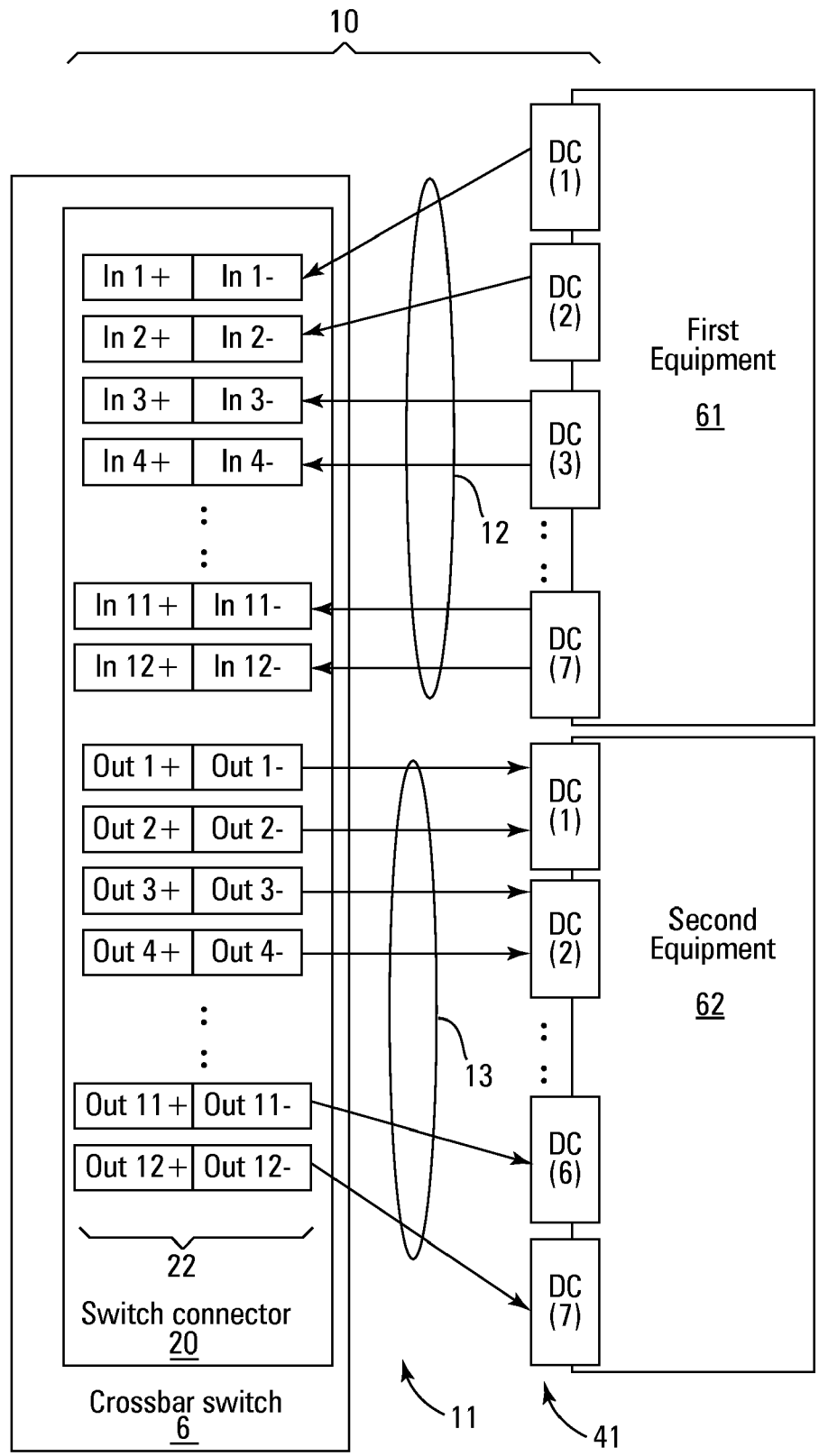

FIGS. 5A and 5B are block diagrams of one embodiment of connectivity for input wire pairs and output wire pairs in a crossbar cable 10 configured for no-receive-diversity. The encasing wrap 19 is not shown for clarity. Wire pairs, which are shown as arrows and are represented generally by the numeral 11, include input wire pairs represented generally by the numeral 12 and output wire pairs represented generally by the numeral 13. The wire pairs 11 are configured for no-receive diversity, so that each of the device connectors (DC) represented generally by the numeral 41 only receives signals or only sends signals. Each input wire pair 12 supports receipt of digital signals at the switch connector 20 from one of the device connectors 41 and each output wire pair 13 supports transmission of digital signals from the switch connector 20 to one of the device connectors 41.

In the exemplary FIGS. 5A-5B, the device connectors 41 are connected to either first equipment 61 or second equipment 62. The sockets 22 in the switch connector 20 are shown coupled to the crossbar switch 6. The sockets 22 are labeled to indicate a socket identification number (such as 1-12), to indicate the direction of data flow (in from or out to the device connector 41), and to indicate if the positive (+) or negative (−) wire in the wire pair is connected to the socket 22.

As shown in FIG. 5A, six device connectors 41 are connected to ports in the first equipment 61 and six other device connectors 41 are connected to ports in the second equipment 62. Inputs from first equipment 61 are received at the crossbar switch 6 via input wire pairs 12 and are output from the crossbar switch 6 to the second equipment 62 via output wire pairs 13. The crossbar cable 10 that comprises wire pairs 11 as shown in FIG. 5A is configured for no receive diversity and supports twelve input wire pairs 12 with six device connectors 41 and twelve output wire pairs 13 with another six device connectors 41.

As shown in FIG. 5B, seven device connectors 41 are connected to ports in the first equipment 61 and seven other device connectors 41 are connected to ports in the second equipment 62. Inputs from first equipment 61 are received at the crossbar switch 6 via input wire pairs 12 and are output from the crossbar switch 6 to the second equipment 62 via output wire pairs 13. As shown in FIG. 5B, each device connector 41 supports either one input wire pair 12, two input wire pairs 12, one output wire pair 13 or two output wire pairs 13. The crossbar cable 10 (FIG. 1) that comprises wire pairs 11 as shown in FIG. 5B is configured for no receive diversity and supports twelve input wire pairs 12 with seven device connectors 41 and twelve output wire pairs 13 with another seven device connectors 41.

In one implementation of this embodiment, a wire pair 11 is one of the twisted-wire pairs in a category 5 cable, a category 6 cable or a category 7 cable. In another implementation of this embodiment, the device connectors 41 are RJ-45 connectors, RJ-11 connectors, DB-9 connectors, terminal wrap connectors, or combinations thereof. In yet another implementation of this embodiment, each device connector 41 supports either one input wire pair 12, two input wire pairs 12, three input wire pairs 12, one output wire pair 13, two output wire pairs 13, or three output wire pairs 13.

Figure 6:
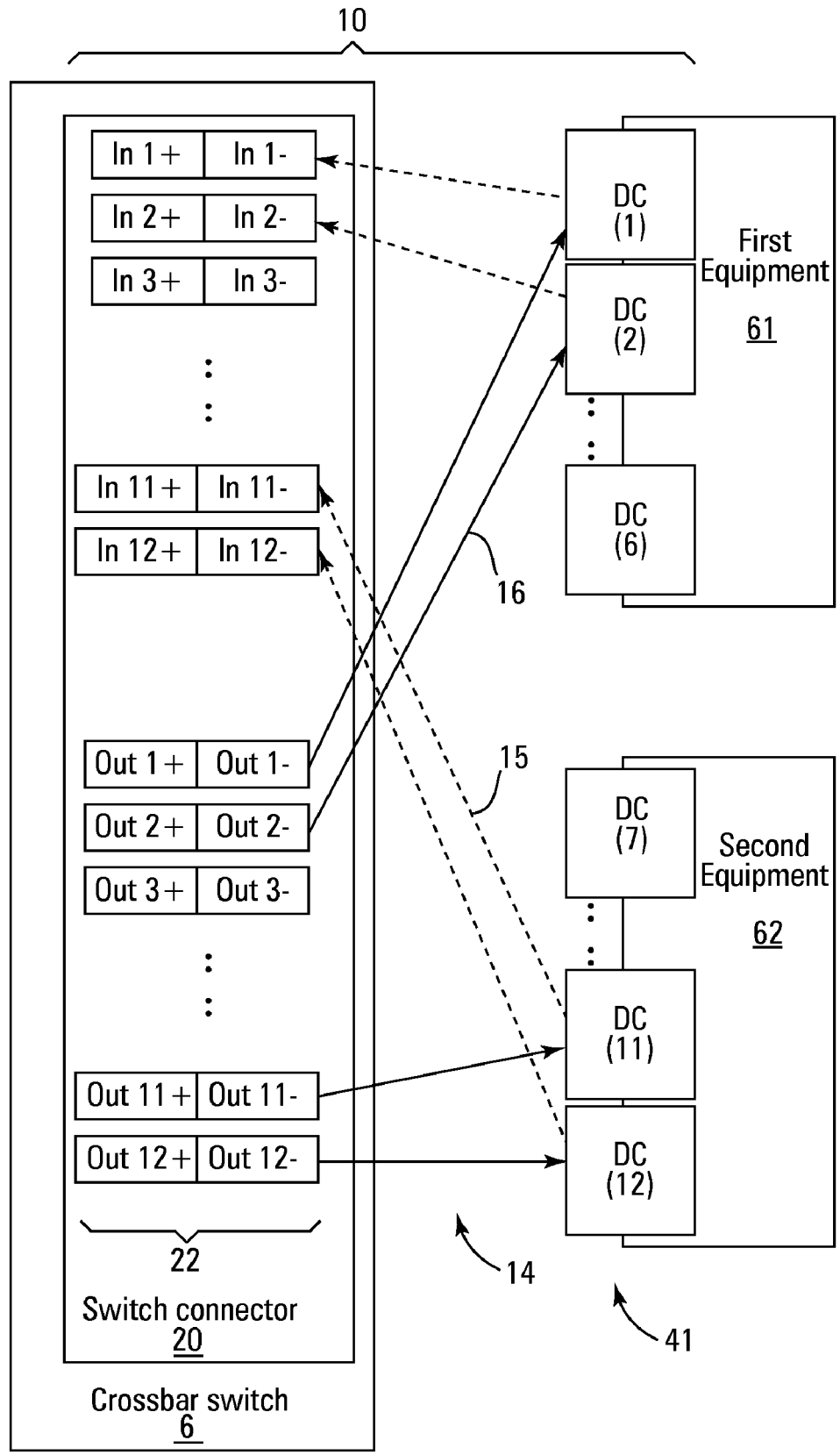
FIG. 6 is a block diagram of one embodiment of connectivity for input wire pairs and output wire pairs in a crossbar cable configured for receive-diversity.

FIG. 6 is a diagram of one embodiment of connectivity for input wire pairs and output wire pairs in a crossbar cable 10 configured for receive-diversity. The encasing wrap 19 is not shown for clarity. Wire pairs 14, include input wire pairs (shown as dashed arrows pointing toward the switch connector 20 and represented generally by the numeral 15) and output wire pairs (shown as solid arrows pointing away from the switch connector 20 and represented generally by the numeral 16). Each input wire pair 15 supports receipt of digital signals at the switch connector 20 from a device connector 41 and each output wire pair 16 supports transmission of digital signals from the switch connector 20 to a device connector 41. In the exemplary FIG. 6, the device connectors 41 are connected to ports in either the first equipment 61 or the second equipment 62. The sockets 22 in the switch connector 20 are shown and labeled as described above with reference to FIGS. 5A and 5B.

The wire pairs 14 are configured for receive diversity, so that each device connector 41 receives and sends signals. Specifically, the wire pairs 14 are configured so that each device connector 41 supports one input wire pair 15 and one output wire pair 16. In this manner, the crossbar cable 10 supports twelve input twisted-wire pairs and twelve output twisted-wire pairs configured for receive diversity. Receive diversity allows inputs from the first equipment 61 and the second equipment 62 to be output from the crossbar switch 6 to either the first equipment 61 or the second equipment 62. Any input can be connected to any output based on the internal configuration of the crossbar switch 6.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A crossbar cable to connect a crossbar switch with a plurality of outputs, the crossbar cable comprising:
   a switch connector comprising a plurality of sockets, the sockets being compatible with ports in the crossbar switch;
   a plurality of cables, each cable having wires connected at a first end to a subset of the sockets in the switch connector;
   a plurality of device connectors, each device connector connected to wires at a second end of a respective one of the plurality of cables, wherein the first ends of the wires in the plurality of cables are connected to the same switch connector, wherein the second ends of the wires in a respective one of the plurality of cables are connected to a respective device connector, and wherein each of the device connectors is communicatively coupled over the wires to the subset of sockets in the switch connector at the first end of its respective one of the plurality of cables; and an encasing wrap to bundle the plurality of cables at least at the first ends of the plurality of cables.

2. The crossbar cable of claim 1, wherein the switch connector comprises:

a plurality of connector subassemblies each connector subassembly being communicatively coupled to at least one device connector.

3. The crossbar cable of claim 2, wherein each connector subassembly comprises at least eight sockets, the eight sockets forming two subsets of sockets.

4. The crossbar cable of claim 3, wherein each connector subassembly further comprises:

two unconnected sockets positioned between the two subsets of sockets.

5. The crossbar cable of claim 2, wherein each connector subassembly comprises at least four sockets, the four sockets forming a subset of sockets.

6. The crossbar cable of claim 2, wherein each of the connector subassemblies comprises a retention mechanism.

7. The crossbar cable of claim 2, wherein the relative positions of the plurality of connector subassemblies within a housing are manually reconfigurable, wherein at least one of the device connectors is communicatively coupled to a different subset of sockets based on the reconfiguration.

8. The crossbar cable of claim 2, wherein the switch connector further comprises a housing in which the connector subassemblies are located.

9. The crossbar cable of claim 1, wherein at least one of the plurality of cables comprises a category 5 cable as defined in ANSI/TIA/EIA-568 standards.

10. The crossbar cable of claim 9, wherein the wires connected at the first end to the subset of the sockets comprise two twisted wire pairs of the four twisted wire pairs in the category 5 cable.

11. The crossbar cable of claim 1, wherein at least one of the plurality of cables comprises a category 6 cable as defined in ANSI/TIA/EIA-568-B.2 standards.

12. The crossbar cable of claim 11, wherein the wires connected at the first end to the subset of the sockets comprise two twisted wire pairs of the four twisted wire pairs in the category 6 cable.

13. The crossbar cable of claim 1, wherein at least one of the plurality of cables comprises a category 7 cable as defined in ISO/IEC 11801 standards.

14. The crossbar cable of claim 13, wherein the wires connected at the first end to the subset of the sockets comprise two twisted wire pairs of the four twisted wire pairs in the category 7 cable.

15. The crossbar cable of claim 1, wherein the plurality of device connectors comprise one of a plurality of RJ-45 connectors, a plurality of RJ-47 connectors, a plurality of RJ-11 connectors, a plurality of DB-9 connectors, a plurality of terminal wrap connectors, and combinations thereof.

16. The crossbar cable of claim 15, wherein the crossbar cable further comprises a plurality of cable boots to protect the plurality of device connectors.

17. The crossbar cable of claim 1, wherein each device connector supports one input wire pair and one output wire pair and wherein the crossbar cable supports twelve input wire pairs and twelve output wire pairs.

18. The crossbar cable of claim 17, wherein each input wire pair supports receipt of digital signals at the switch connector from one of the device connectors and each output wire pair supports transmission of digital signals from the switch connector to one of the device connectors.

19. The crossbar cable of claim 1, wherein each device connector supports one of: one input wire pair; one output wire pair; two input wire pairs; and two output wire pairs.

20. The crossbar cable of claim 19, wherein the crossbar cable supports twelve input wire pairs and twelve output wire pairs connected to at least twelve device connectors.

21. The crossbar cable of claim 19, wherein each input wire pair supports receipt of digital signals at the switch connector from one of the device connectors and each output wire pair supports transmission of digital signals from the switch connector to one of the device connectors.

22. The crossbar cable of claim 1, further comprising labels on each of the plurality of cables to indicate the connections between the sockets of the switch connector and the device connector that is communicatively coupled by at least one wire pair.

23. The crossbar cable of claim 22, wherein each label is nearer the second end of the associated cable than the first end of the associated cable.

24. A crossbar cable to connect a crossbar switch with a plurality of outputs, the crossbar cable comprising:

a switch connector comprising a plurality of sockets;

a plurality of category 6 cables each having twisted wire pairs connected at a first end to a subset of the sockets in the switch connector;

a plurality of RJ-45 connectors, each RJ-45 connector connected to a second end of the twisted-wire pairs of a respective one of the category 6 cables, wherein the first ends of the wires in the plurality of category 6 cables are connected to the same switch connector, wherein the second ends of the wires in a respective one of the plurality of category 6 cables are connected to a respective RJ-45 connector, and wherein each of the RJ-45 connectors is communicatively coupled to the subset of sockets in the switch connector; and an encasing wrap to bundle the plurality of category 6 cables at least at the first ends.

25. The crossbar cable of claim 24, wherein the switch connector comprises:

a plurality of connector subassemblies, each connector subassembly comprising two subsets of sockets, each subset communicatively coupled to a respective RJ-45 connector.

26. The crossbar cable of claim 25, wherein the switch connector further comprises a housing in which the connector subassemblies are located, wherein relative positions of the plurality of connector subassemblies are manually reconfigurable within the housing, and wherein at least two of the RJ-45 connectors are communicatively coupled to a different subset of sockets based on the reconfiguration.

27. The crossbar cable of claim 24, further comprising labels on each of the plurality of category 6 cables to indicate the connections between the sockets of the switch connector and the RJ-45 connector that is communicatively coupled by at least one twisted-wire pair.

28. The crossbar cable of claim 27, wherein each label is nearer the second end than the first end of the twisted-wire pairs of the category 6 cable.

29. The crossbar cable of claim 24, wherein each RJ-45 connector supports one input twisted-wire pair and one output twisted-wire pair, and wherein the crossbar cable supports twelve input twisted-wire pairs and twelve output twisted-wire pairs configured for receive diversity.

30. The crossbar cable of claim 29, wherein each input twisted-wire pair supports receipt of digital signals at the switch connector from one of the RJ-45 connectors and each output twisted-wire pair supports transmission of digital signals from the switch connector to one of the RJ-45 connectors.

31. The crossbar cable of claim 24, wherein each RJ-45 connector supports one of: one input twisted-wire pair; one output twisted-wire pair; two input twisted-wire pairs; and two output twisted-wire pair and wherein the crossbar cable supports twelve input twisted-wire pairs and twelve output twisted-wire pairs connected to at least twelve RJ-45 connectors.

32. The crossbar cable of claim 31, wherein each input twisted-wire pair supports receipt of digital signals at the switch connector from one of the RJ-45 connectors and each output twisted-wire pair supports transmission of digital signals from the switch connector to one of the RJ-45 connectors.

33. The crossbar cable of claim 24, wherein the crossbar cable further comprises a plurality of cable boots to protect the plurality of RJ-45 connectors.

34. A crossbar cable to connect a crossbar switch with a plurality of outputs, the cable comprising:

a switch connector comprising six connector subassemblies located in a housing, each subassembly comprising ten sockets, wherein the ten sockets form two subsets of four sockets and one subset of two sockets, the subset of two sockets positioned between the subsets of four sockets;

twelve category 6 cables bundled in an encasing wrap, each category 6 cable having four twisted wire pairs, wherein two of the four twisted wire pairs are connected at a first end to one of the subsets of four sockets; and twelve RJ-45 connectors, each RJ-45 connector connected to a second end of the two twisted wire pairs of respective ones of the twelve category 6 cables, wherein four wires forming the two twisted-wire pairs of each of the RJ-45 connectors are communicatively coupled to a respective one of the subsets of four sockets.

35. The crossbar cable of claim 34, wherein the crossbar cable supports twelve input twisted-wire pairs and twelve output twisted-wire pairs configured for receive diversity.

36. The crossbar cable of claim 34, wherein the crossbar cable supports twelve input twisted-wire pairs and twelve output twisted-wire pairs configured for no receive diversity.

37. The crossbar cable of claim 34, wherein the encasing wrap extends from the switch connector along the length of the category 6 cables for at least three inches.

38. The crossbar cable of claim 34, wherein the crossbar cable further comprises twelve cable boots to protect the twelve RJ-45 connectors.

* * * * *